United States Patent
Xu et al.

(10) Patent No.: US 9,798,168 B2
(45) Date of Patent: Oct. 24, 2017

(54) PROCESSING MACHINE OF DISPLAY APPARATUS AND PROCESSING METHOD OF GLASS SUBSTRATE

(71) Applicant: Shenzhen China Star Optoelectronics Technology Co., Ltd., Shenzhen, Guangdong (CN)

(72) Inventors: Tao Xu, Guangdong (CN); Bin Xu, Guangdong (CN); Chung-hsien Fang, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 184 days.

(21) Appl. No.: 14/425,620

(22) PCT Filed: Dec. 9, 2014

(86) PCT No.: PCT/CN2014/093348
§ 371 (c)(1),
(2) Date: Mar. 3, 2015

(87) PCT Pub. No.: WO2016/086430
PCT Pub. Date: Jun. 9, 2016

(65) Prior Publication Data
US 2016/0341982 A1     Nov. 24, 2016

(30) Foreign Application Priority Data
Dec. 5, 2014 (CN) .......................... 2014 1 0737618

(51) Int. Cl.
*B25B 11/00* (2006.01)
*G02F 1/13* (2006.01)
*G11B 5/84* (2006.01)

(52) U.S. Cl.
CPC .......... *G02F 1/1303* (2013.01); *B25B 11/002* (2013.01); *G11B 5/8404* (2013.01)

(58) Field of Classification Search
CPC .................................................... G02F 1/1303
(Continued)

(56) References Cited

U.S. PATENT DOCUMENTS

| 493,766 A | * | 3/1893 | Graham | ................ | G01C 11/00 |
| | | | | | 33/1 AA |
| 2,621,807 A | * | 12/1952 | Rendich | ............... | B23Q 16/001 |
| | | | | | 211/50 |

(Continued)

FOREIGN PATENT DOCUMENTS

| CN | 101158770 A | 4/2008 |
| CN | 103247304 A | 8/2013 |

(Continued)

*Primary Examiner* — Larry E Waggle, Jr.
*Assistant Examiner* — Tyrone V Hall, Jr.
(74) *Attorney, Agent, or Firm* — Andrew C. Cheng

(57) ABSTRACT

The present invention discloses a processing machine of a display apparatus, the processing machine comprises: a metal support plate; a plurality of support structures, which is movably disposed on the support plate, is used for supporting on the non-display region of the glass substrate, wherein the position of which the support structure is disposed on the metal support plate is corresponded to the position of the non-display region in the panel of the glass substrate, in order to make the support structure placed on the non-display region. The present invention also discloses a processing method of a glass substrate. Through the above way, the present invention can avoid the support structure placed on the display region of the glass substrate, effectively preventing the phenomenon of the brightness uneven.

5 Claims, 3 Drawing Sheets

(58) Field of Classification Search
USPC ...... 269/265, 266, 296, 309–314, 37, 45, 81
See application file for complete search history.

(56) References Cited

U.S. PATENT DOCUMENTS

| | | | | |
|---|---|---|---|---|
| 4,848,005 | A | * | 7/1989 | Ercole .................... G12B 5/00 33/1 M |
| 4,930,634 | A | | 6/1990 | Wliilams |
| 5,076,612 | A | * | 12/1991 | Nirmel .................. A47G 1/205 283/67 |
| 5,085,414 | A | * | 2/1992 | Weaver ................ B23Q 16/001 269/304 |
| 6,309,204 | B1 | | 10/2001 | Atobe |
| 6,644,637 | B1 | * | 11/2003 | Shen ...................... B25B 5/061 269/152 |
| 7,866,642 | B2 | * | 1/2011 | McAllister ............ B23Q 1/035 269/266 |
| 8,109,808 | B2 | | 2/2012 | Uchiyama |
| 8,347,811 | B2 | * | 1/2013 | Bucci .................... B05B 13/02 118/500 |
| 8,448,471 | B2 | * | 5/2013 | Kumatani .......... B23K 26/0676 65/105 |
| 2005/0109590 | A1 | * | 5/2005 | Shen ...................... B23Q 1/032 198/867.08 |
| 2012/0032380 | A1 | * | 2/2012 | Riachentsev ............ B25B 5/06 269/8 |

FOREIGN PATENT DOCUMENTS

| | | |
|---|---|---|
| CN | 203241662 U | 10/2013 |
| CN | 203870363 U | 10/2014 |
| JP | 2013140648 A | 7/2013 |

* cited by examiner

PROCESSING MACHINE OF DISPLAY APPARATUS AND PROCESSING METHOD OF GLASS SUBSTRATE

BACKGROUND OF THE INVENTION

1. Field of the Invention

The present invention relates to a liquid crystal technical field, and in particular to a processing machine of a display apparatus and a processing method of a glass substrate.

2. The Related Arts

Along with the development of technology, the liquid crystal panel has been applied in various fields, televisions, computers and cell phones used in people's lives all adopts the liquid crystal panel, it is more and more important for people's lives.

In the process of the liquid crystal panel, it requires color photoresist processing for the glass substrate, processing the glass substrate with vacuum and drying after the coating, and then processing the glass substrate with subsequently exposed, developed and baked after drying, finally forming the liquid crystal panel, thereby producing the liquid crystal display device.

Before the above processing steps, it requires transportation for the glass substrate, the prior support structures used to support the glass substrate are fixed, and the panel layouts for each glass substrate are different, in many circumstances, most of the support structures can be supported on the non-display region of the glass substrate, but it still occur the phenomenon which there are some support structures supported on the display region of the glass substrate, it easily leads the brightness of the finished product of the liquid crystal display device uneven.

SUMMARY OF THE INVENTION

The technical issues to be mainly solved by the present invention is to provide a processing machine of a display apparatus and a processing method of a glass substrate, it can avoid the support structures supported on the display region of the glass substrate.

In order to solve the above technical issues, a technical solution adopted by the present invention is: to provide a processing machine of a display apparatus, which comprises: a metal support plate; a plurality of support structures, which is movably disposed on the support plate, is used for supporting on the non-display region of the glass substrate, wherein the position of which the support structure is disposed on the metal support plate is corresponded to the position of the non-display region in the panel of the glass substrate, in order to make the support structure placed on the non-display region; the metal support plate is engraved with coordinate axes, the coordinate axes set the center point of the metal support plate as the origin, the coordinate axes set the longitudinal direction of the metal support plate as the horizontal axis, the coordinate axes set the width direction of the metal support plate as the vertical axis, in order to control the support structure to move on the coordinate axes of the metal support plate according to the panel layout of the glass substrate; the support structure can be movable disposed on the metal support plate through the magnetic force; the support structure is disposed along with the horizontal axis or the vertical axis of the coordinate axis on the metal support plate.

Wherein the support structure comprises: a rectangular stationary plate, in the middle of which is provided with a rectangular groove; a plurality of support legs, which is used to support the glass substrate, can move along with the longitudinal direction of the groove in the groove in order to be fixed on the stationary plate, and adsorb on the metal support plate through magnetic force.

In order to solve the above technical issues, another technical issues adopts by the present invention is: to provide a processing machine of a display apparatus, which comprises a metal support plate; a plurality of support structures, which is movably disposed on the support plate, is used for supporting on the non-display region of the glass substrate, wherein the position of which the support structure is disposed on the metal support plate is corresponded to the position of the non-display region in the panel of the glass substrate, in order to make the support structure placed on the non-display region.

Wherein the metal support plate is engraved with coordinate axes, the coordinate axes set the center point of the metal support plate as the origin, the coordinate axes set the longitudinal direction of the metal support plate as the horizontal axis, the coordinate axes set the width direction of the metal support plate as the vertical axis, in order to control the support structure to move on the coordinate axes of the metal support plate according to the panel layout of the glass substrate.

Wherein the support structure can be movable disposed on the metal support plate through the magnetic force.

Wherein the support structure is disposed along with the horizontal axis or the vertical axis of the coordinate axis on the metal support plate.

Wherein the support structure comprises: a rectangular stationary plate, in the middle of which is provided with a rectangular groove; a plurality of support legs, which is used to support the glass substrate, can move along with the longitudinal direction of the groove in the groove in order to be fixed on the stationary plate, and adsorb on the metal support plate through magnetic force.

Wherein the stationary plate is provided scale along with the longitudinal direction of the groove, in order to control the support legs move along with the scale according to the panel layout of the glass substrate, making the support legs placed on the non-display region of the glass substrate.

Wherein the plurality of support legs are at least two support legs.

Wherein the support leg comprises: a support end, which is used to support the glass substrate; a magnetic body, which is disposed in the groove, can move along with the longitudinal direction of the groove in the groove in order to be fixed on the stationary plate, and adsorb on the metal support plate through magnetic force.

Wherein the bottom of the support end is rotatably connected with the magnetic body, making the magnetic body move along with the longitudinal direction of the groove in the groove through rotating the support end toward the first direction, making the magnetic body fixed on the stationary plate through rotating the support end toward the second direction.

In order to solve the above technical issues, the other technical issues adopted by the present invention is: to provide a processing method of a glass substrate, wherein the processing method utilizes the processing machine to process the glass substrate, the processing method comprises: obtaining panel layout of the glass substrate; moving the support structure on the metal support plate according to the panel layout of the glass substrate, in order to make the support legs placed on the non-display region of the glass substrate; wherein the processing machine comprises: machine comprises: a metal support plate; a plurality of support structures, which is movably disposed on the support plate, is used for supporting on the non-display region of the glass substrate, wherein the position of which the support structure is disposed on the metal support plate is corresponded to the position of the non-display region in the panel of the glass substrate, in order to make the support structure placed on the non-display region.

Wherein the metal support plate is engraved with coordinate axes, the coordinate axes set the center point of the metal support plate as the origin, the coordinate axes set the longitudinal direction of the metal support plate as the horizontal axis, the coordinate axes set the width direction of the metal support plate as the vertical axis, in order to control the support structure to move on the coordinate axes of the metal support plate according to the panel layout of the glass substrate.

Wherein the support structure can be movable disposed on the metal support plate through the magnetic force.

Wherein the support structure is disposed along with the horizontal axis or the vertical axis of the coordinate axis on the metal support plate.

Wherein the support structure comprises: a rectangular stationary plate, in the middle of which is provided with a rectangular groove; a plurality of support legs, which is used to support the glass substrate, can move along with the longitudinal direction of the groove in the groove in order to be fixed on the stationary plate, and adsorb on the metal support plate through magnetic force.

Wherein the stationary plate is provided scale along with the longitudinal direction of the groove, in order to control the support legs move along with the scale according to the panel layout of the glass substrate, making the support legs placed on the non-display region of the glass substrate.

Wherein the plurality of support legs are at least two support legs.

Wherein the support leg comprises: a support end, which is used to support the glass substrate; a magnetic body, which is disposed in the groove, can move along with the longitudinal direction of the groove in the groove in order to be fixed on the stationary plate, and adsorb on the metal support plate through magnetic force.

Wherein the bottom of the support end is rotatably connected with the magnetic body, making the magnetic body move along with the longitudinal direction of the groove in the groove through rotating the support end toward the first direction, making the magnetic body fixed on the stationary plate through rotating the support end toward the second direction.

The benefit effect of the present invention is: differ to the prior arts, a processing machine of a display apparatus of the present invention comprises: a metal support plate; a plurality of support structures, which is movably disposed on the support plate, is used for supporting on the non-display region of the glass substrate, wherein the position of which the support structure is disposed on the metal support plate is corresponded to the position of the non-display region in the panel of the glass substrate, in order to make the support structure placed on the non-display region, it can avoid the support structures supported on the display region of the glass substrate, effectively prevent the brightness uneven of the liquid crystal display device.

DETAILED DESCRIPTION OF THE PREFERRED EMBODIMENTS

Figure 1:
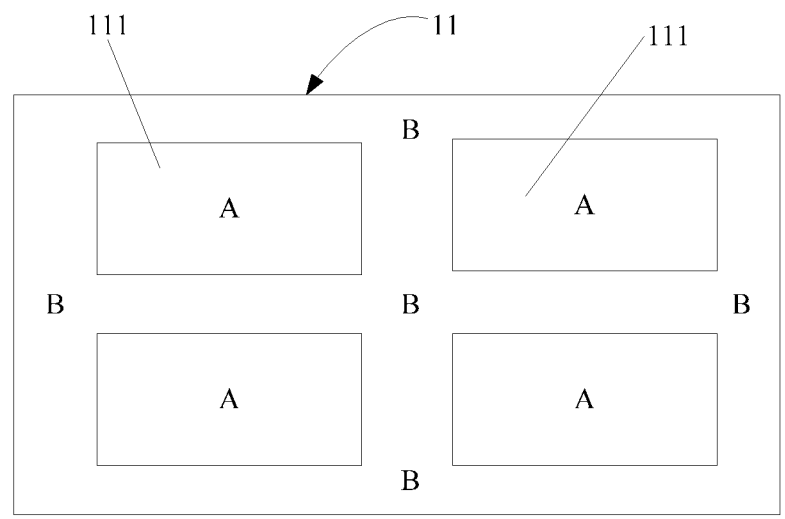
FIG. 1 is a schematic diagram of panel layout of the glass substrate.
Figure 2:
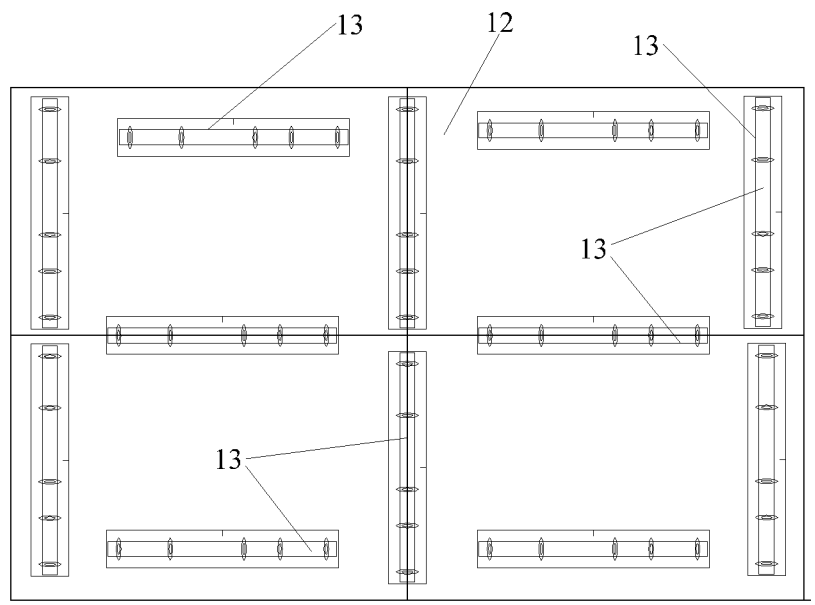
FIG. 2 is a structure diagram of the processing machine of the display apparatus in the present invention.
Figure 3:
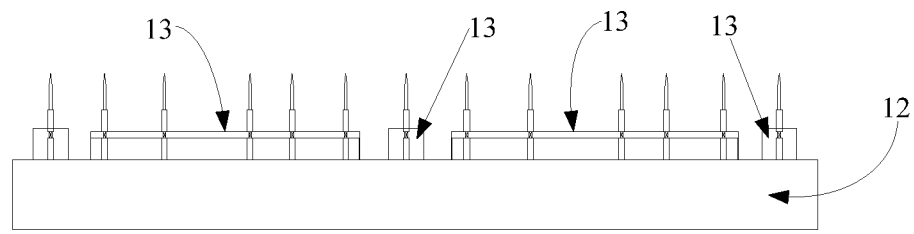
FIG. 3 is a sectional structure diagram of the processing machine of the display apparatus in FIG. 2.
Figure 4:
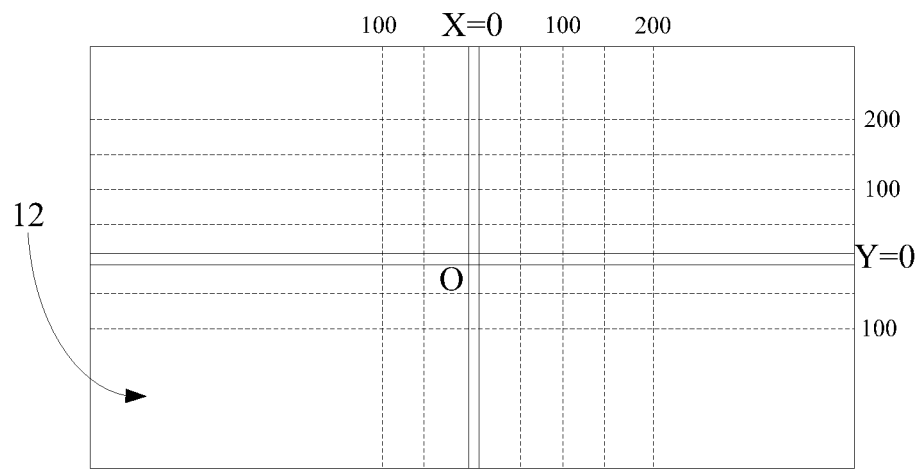
FIG. 4 is a structure diagram of the metal support plate in FIG. 2.
Figure 5:
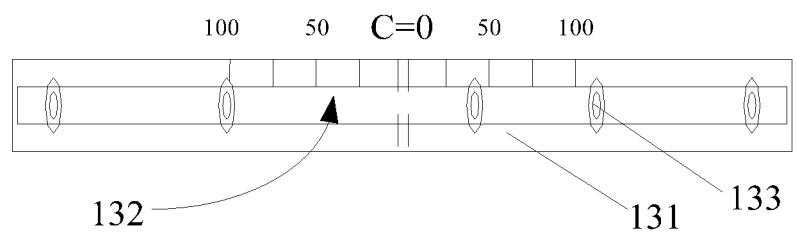
FIG. 5 is a top view structure diagram of the support structure in FIG. 2.
Figure 6:
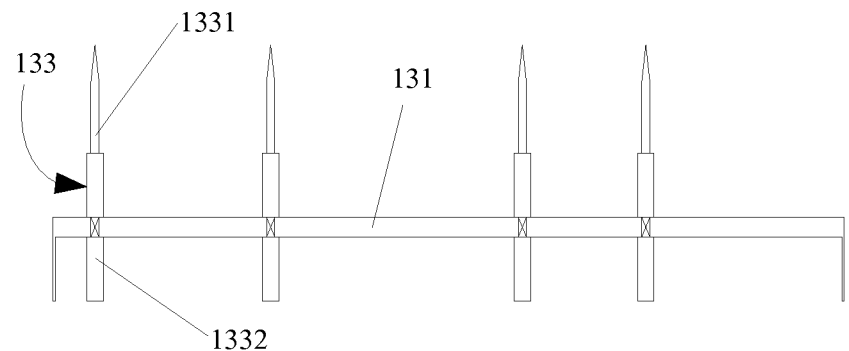
FIG. 6 is a front view structure diagram of the support structure in FIG. 2.

The following will combine the drawings of the embodiments to further describe.

As shown in FIG. 1 to FIG. 6, the present invention discloses a processing machine of a display device, the processing machine comprises a metal support plate 12 and a plurality of support structure 13, and the metal support plate 12 is rectangular. The support structure 13 is used for supporting on the non-display region B of the glass substrate 11. Wherein the position of which the support structure 13 is disposed on the metal support plate 12 is corresponded to the position of the non-display region B in the panel 111 of the glass substrate 11, in order to make the support structures 13 placed on the non-display region B of the glass substrate 11.

The support structure 13 can be movably disposed on the metal support plate 12. In the present embodiment, the support structure 13 is fixed and connected with the metal support plate 12 through magnetic force. It should be realized that the support structure 13 also can be fixed and connected with the metal support plate 12 through the other ways.

In the present embodiment, the support structure 13 is preferably a magnetic structure, is can be adsorbed on the metal support plate 12. Of course, in the other embodiments, the support structure 13 is similarly the metal body, when the metal support 12 is energized, the metal support plate 12 can generate the magnetic force and is fixed as well as connected with the support structure 13, when the metal support plate 12 is de-energized, the magnetic force of the metal support plate 12 disappears so that the support structure 13 can move on the metal support plate 12.

In the present embodiment, in the liquid crystal panel process, according to the panel layout of the glass substrate 11, change the position where the support structure 13 locates on the metal support plate 12, making the position of which the support structure 13 is disposed on the metal support plate 12 is corresponded to the position of the non-display region B in the panel 111 of the glass substrate 11, thereby making the support structure 13 placed on the non-display region B of the glass substrate 11; namely, avoiding the support structure 13 placed on the display region A of the glass substrate 11.

Specifically, the metal support plate 12 is engraved with coordinate axes, the coordinate axes set the center point of the metal support plate 12 as the origin O, the coordinate axes set the longitudinal direction of the metal support plate 12 as the horizontal axis Y, the coordinate axes set the width direction of the metal support plate 12 as the vertical axis X, in order to control the support structure 13 to move on the coordinate axes of the metal support plate 12 according to the panel layout of the glass substrate 11. The support structure 13 is disposed along with the horizontal axis or the vertical axis of the coordinate axis on the metal support plate 12, it should be realized that the support structure 13 also can be disposed on the metal support plate 12 in any angles according to the panel layout of the glass substrate 11. Take the panel layout of the glass substrate 11 for example, the coordinate axis pitch is 50 mm; namely, customers can set the coordinate axis pitch according to their requirements. The size of the glass substrate 11 corresponds to the metal support plate 12, there are many panels 111 disposed on the glass substrate 11, correspond to the position of the coordinate space of the metal support plate 12 according to the panel layout of the glass substrate 11, move the support structure 13 on the coordinate axis of the metal support plate 12, making the support structure 13 placed on the non-display region B of the glass substrate 11.

The support structure 13 comprises a rectangular stationary plate 131 and a plurality of support legs 133 disposed on the stationary plate 131. Wherein the support leg 133 can removable disposed on the stationary plate 131, and the support legs 133 on the stationary plate 133 can be fine-tuned according to the actual needs, so that the support legs 133 can be concentrated in the part of the stationary plate 131, or the support legs 133 can be uniformly dispersed on each position of the stationary plate 131 in order to make each support legs 133 bear the same weight of the glass substrate 11; meanwhile, the support legs 133 also can be removed or added more from the stationary plate 131.

There is a rectangular groove 132 in the middle of the stationary plate 131. It should be realized that the stationary plate 131 and the groove 132 are not only rectangular, those can be particularly set according to the actual situation. The support leg 133 is used to support the glass substrate, it can move along with the longitudinal direction of the groove 132 in the groove 132 in order to be fixed on the stationary plate 131, and adsorb on the metal support plate 12 through magnetic force. In the present embodiment, the plurality of support legs 133 are at least two support legs 133; namely, the plurality of support legs 133 can be two, three, four, five, six, or more support legs 133.

In the present embodiment, the stationary plate 131 is provided scale along with the longitudinal direction of the groove 132, the scale sets the center C of the groove 132 as an origin, stretching along with the groove 1322, the scale pitch is 25 mm, in order to be able to control the support legs 133 to move on the scale of the stationary plate 131 according to the panel layout if the glass substrate 11, making the support legs 133 placed on the non-display region B of the glass substrate 11. It should be realized that customers can set the scale pitch according to their requirements.

The support leg 133 comprises a support end 1331 and a magnetic body 1332. The support end 1331 is used to support the glass substrate 11. The magnetic body is disposed in the groove 132, can move along with the longitudinal direction of the groove 132 in the groove 132 in order to be fixed on the stationary plate 131, and adsorb on the metal support plate 12 through magnetic force. Specifically, the magnetic body 1331 comprises a first magnetic body, a second magnetic body and a connected body, the sizes of the first magnetic body and a second magnetic body are greater than the width of the groove 132. The connected body crosses through the groove 132 and is connected with the first magnetic body and the second magnetic body that are disposed on both sides of the stationary plate 131. Wherein the first magnetic body 1331 is connected with the support end 1331. The first magnetic body and the second magnetic body can be clamped on the stationary plate 131 through rotating the support end 1331.

In the present embodiment, the support end 1331 is rotatably connected with the magnetic body 1332; namely, the bottom of the support end 1331 is connected with the magnetic body 1332 in rotary way, making the magnetic body 1332 move along with the longitudinal direction of the groove 132 in the groove 132 through rotating the support end 1331 toward the first direction, making the magnetic body 1332 fixed on the stationary plate 131 through rotating the support end 1331 toward the second direction. Wherein the first direction is clockwise direction, the second direction is counterclockwise; or the second direction is clockwise direction, the first direction is counterclockwise.

The present embodiment through the process of the liquid crystal panel, according to the panel layout of the glass substrate 11, can adjust the overall position where the support structure 13 is placed on the metal support plate 12, making the position of which the support structure 13 is disposed on the metal support plate 12 is corresponded to the position of the non-display region B in the panel 111 of the glass substrate 11, thereby making the support structure 13 placed on the non-display region of the glass substrate; otherwise, according to the requirements, the plurality of legs 133 disposed on the stationary plate 131 also can be fine-tuned, so that the support legs 133 can be concentrated in the part of the stationary plate 131, or the support legs 133 can be uniformly dispersed on each position of the stationary plate 131, it can save time and quickly adjust the support structure 13 placed on the non-display region B of the glass substrate 11.

Figure 7:
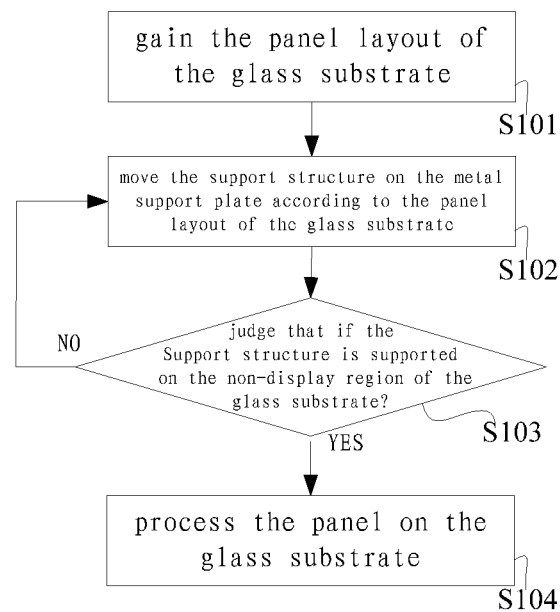
FIG. 7 is a flow diagram of the processing method of the glass substrate in the present invention.

As shown in FIG. 7, FIG. 7 is a processing method of the glass substrate by using the processing machine in FIG. 1 to FIG. 6, which comprises the following steps:

Step S101: gain the panel layout of the glass substrate 11.

Wherein in the process of the glass substrate, gain the panel layout of the glass substrate 11 at first, and dispose a plurality of panels 111 on each glass substrate 11; namely, the panel layouts of various product type glass substrates 11 are different.

Step S102: move the support structure 13 on the metal support plate 12 according to the panel layout of the glass substrate 11.

In step S102, according to the panel layout of the glass substrate 11, it is able to adjust the position where the support structure 13 is placed on the metal support plate 12 at first, making the position of which the support structure 13 is disposed on the metal support plate 12 is corresponded to the position of the non-display region B in the panel 111 of the glass substrate 11, in order to make the support structure 13 placed on the non-display region B of the glass substrate 11; moreover, according to the requirements, the plurality of legs 133 disposed on the stationary plate 131 also can be fine-tuned, so that the support legs 133 can be concentrated in the part of the stationary plate 131, or the support legs 133 can be uniformly dispersed on each position of the stationary plate 131.

Step S103: judge that if the support structure 13 is supported on the non-display region B of the glass substrate 131.

If the support structure 13 is not supported on the non-display region B of the glass substrate 11, such as that the support structure 13 is partially supported on the display region A of the glass substrate 11, return to the step S102 and keep adjusting the support structure 13 on the metal support plate 12. If the judgment result shows that the support structure 13 is supported on the non-display region B of the glass substrate 11, go on the step S104: process the panel on the glass substrate 11.

Once the processes of the similar glass substrate 11 by the above steps are completed, if it is needed to process the other different type glass substrate, then move the support structure 13 on the metal support plate 12 according to the panel layout of the other different type glass substrate, in order to make the support structure 13 supported on the non-display region B of the glass substrate 11.

In summary, the processing machine of the display apparatus of the present invention comprises: a metal support plate; a plurality of support structures, which is movably disposed on the support plate, is used for supporting on the non-display region of the glass substrate, wherein the position of which the support structure is disposed on the metal support plate is corresponded to the position of the non-display region in the panel of the glass substrate, in order to make the support structure placed on the non-display region, it can avoid the support end of the support structure placed on the display region of the glass substrate, effectively preventing the phenomenon of the brightness uneven.

The preferred embodiments according to the present invention are mentioned above, which cannot be used to define the scope of the right of the present invention. Those variations of equivalent structure or equivalent process according to the present specification and the drawings or directly or indirectly applied in other areas of technology are considered encompassed in the scope of protection defined by the claims of the present invention.

What is claimed is:

1. A processing machine of a display apparatus, wherein the processing machine comprises:
   a metal support plate;
   a plurality of support structures, which are movably disposed on the metal support plate, are used for supporting a non-display region of a glass substrate, wherein the position of the plurality of support structures are disposed on the metal support plate at a corresponding position of the non-display region of the glass substrate;
   the metal support plate comprises engraved coordinate axes, wherein the coordinate axes origin is set at a center point of the metal support plate, wherein a horizontal axis of the coordinate axes is set in a longitudinal direction of the metal support plate, wherein a vertical axis of the coordinate axes is set in a width direction of the metal support plate, in order to control the plurality of support structures to move on the coordinate axes of the metal support plate according to the glass substrate;
   the plurality of support structures can be movably disposed on the metal support plate through a magnetic force;
   the plurality of support structures being disposed along with the horizontal axis or the vertical axis of the coordinate axis on the metal support plate;
   wherein the plurality of support structures comprises:
   a rectangular stationary plate, in the middle of which is provided with a rectangular groove;
   a plurality of support legs, which are used to support the glass substrate, move along the longitudinal direction of the groove in order to be fixed on the stationary plate, and attracted on the metal support plate through the magnetic force.

2. The processing machine as claimed in claim 1, wherein the stationary plate is provided a scale along the longitudinal direction of the groove, in order to control placement of the support legs movement along the scale according to the glass substrate, positioning the support legs on the non-display region of the glass substrate.

3. The processing machine as claimed in claim 1, wherein the plurality of support legs are at least two support legs.

4. The processing machine as claimed in claim 1, wherein the support legs comprises:
   a support end, which is used to support the glass substrate;
   a magnetic body, which is disposed in the groove, movable in the longitudinal direction of the groove in order to be fixed on the stationary plate, and attracted on the metal support plate through magnetic force.

5. The processing machine as claimed in claim 4, wherein the bottom of the support end is rotatably connected with the magnetic body, wherein the magnetic body is movable along the longitudinal direction of the groove through rotating the support end toward a first direction, wherein the magnetic body is fixed on the stationary plate through rotating the support end toward a second direction.

* * * * *